United States Patent
Arthurs et al.

[11] Patent Number: 5,704,645
[45] Date of Patent: Jan. 6, 1998

[54] OCCUPANT RESTRAINT SYSTEM

[75] Inventors: Kirk D. Arthurs, Newport; Barbara A. McKeehan, Canton, both of Mich.

[73] Assignee: Ford Global Technologies, Inc., Dearborn, Mich.

[21] Appl. No.: 623,080

[22] Filed: Mar. 28, 1996

[51] Int. Cl.$^6$ .................................................. B60R 22/28
[52] U.S. Cl. ............................ 280/805; 188/374; 297/470
[58] Field of Search ........................................ 280/805, 806, 280/808; 297/468, 470, 471, 472, 480; 188/371, 374

[56] References Cited

U.S. PATENT DOCUMENTS

| | | | |
|---|---|---|---|
| 3,547,468 | 12/1970 | Giuffrida | 297/386 |
| 3,561,690 | 2/1971 | Muskat | 297/472 |
| 3,862,673 | 1/1975 | Benson | 280/805 |
| 3,973,650 | 8/1976 | Nagazumi | 280/805 |
| 4,201,418 | 5/1980 | Reidelbach et al. | 280/805 |
| 4,358,136 | 11/1982 | Tsuge et al. | 297/472 |
| 4,974,876 | 12/1990 | Svensson et al. | 280/807 |
| 5,464,252 | 11/1995 | Kanazawa et al. | 280/805 |

FOREIGN PATENT DOCUMENTS

| | | | |
|---|---|---|---|
| 4108440 | 10/1991 | Germany. | |
| 2167647 | 6/1986 | United Kingdom | 280/805 |

*Primary Examiner*—Paul N. Dickson
*Attorney, Agent, or Firm*—Neil P. Ferraro

[57] ABSTRACT

An occupant restraint system for a vehicle having an energy absorbing device. The energy absorbing device is attached to a vehicle pillar and is also attached to the vehicle's seat belt. When a predetermined load is placed on the seat belt, the energy absorbing device is activated to reduce the peak load. The energy absorbing device includes a spool rotatably mounted to the pillar, a wire member attached at one end to the spool, wound around the spool, and attached at another end to the seat belt. Tear resistant media at least partially encases the wire member and the spool such that as the wire member unwinds from the spool, it cuts through the tear resistant media thereby absorbing energy so as to reduce the peak seat belt load.

19 Claims, 4 Drawing Sheets

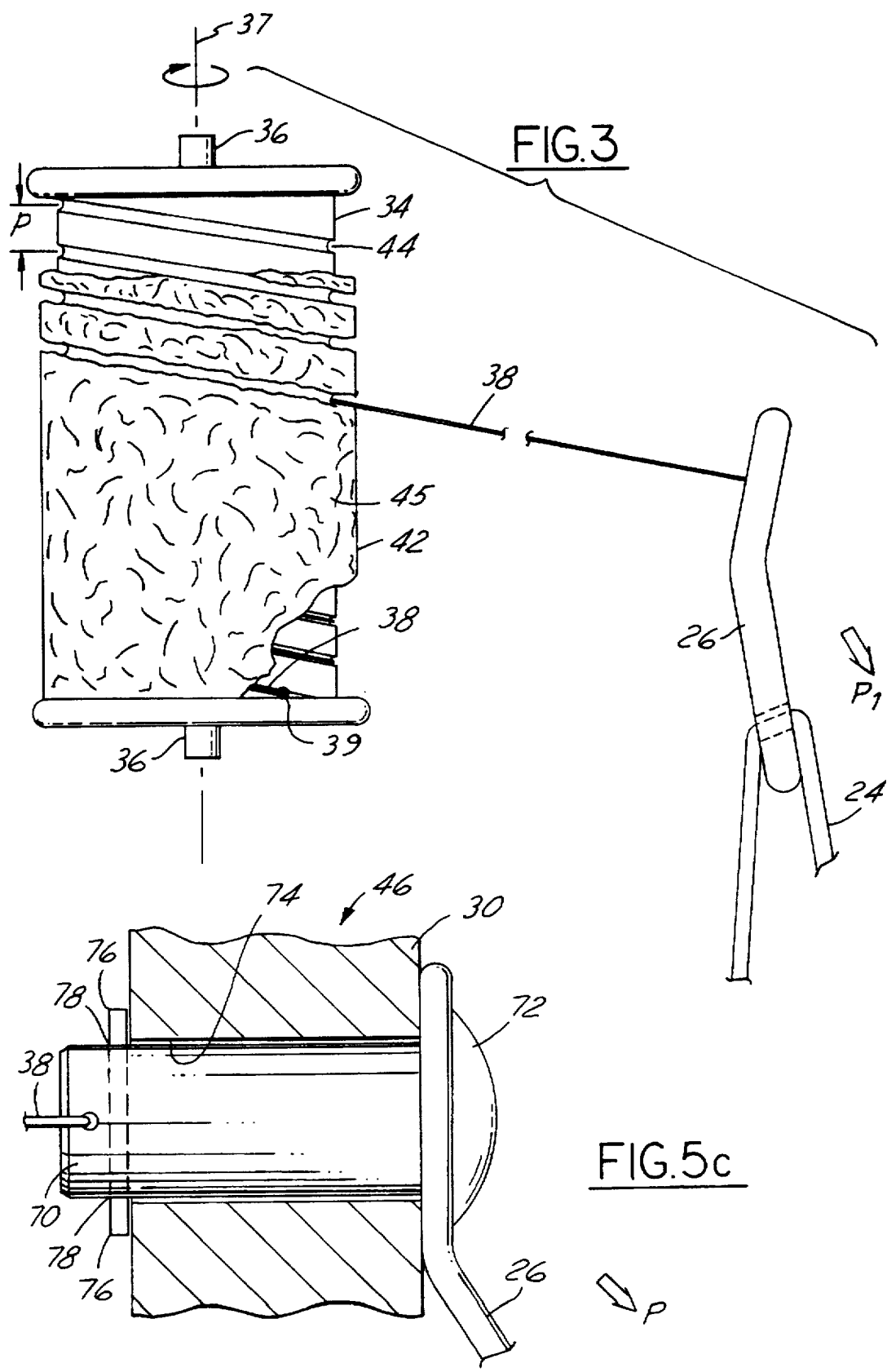

5,704,645

1

OCCUPANT RESTRAINT SYSTEM

FIELD OF THE INVENTION

The present invention relates generally to an occupant restraint system of a vehicle, and more particularly to, a seat belt system having an energy absorbing device.

BACKGROUND OF THE INVENTION

Automotive engineers have placed continued emphasis in the design of occupant restraint systems. Various restraint systems exist to restrain occupants against substantial forward movement as a vehicle rapidly decelerates. It is desirable to reduce any high peak loads to which an occupant may be subjected as a result of this rapid deceleration. Prior art systems interpose a spring bias between the seat belt and the pillar structure of the vehicle to reduce such peak loads. U.S. Pat. No. 3,547,468 is exemplary of such a system. However, these systems have the disadvantage of being unduly complex and expensive and may even cause undesirable rattle.

SUMMARY OF THE INVENTION

An object of the present invention is to provide an energy absorbing device for an occupant restraint system in a vehicle which reduces peak loads.

The above object is achieved and disadvantages of prior art approaches overcome by providing a novel energy absorbing device for an occupant restraint system in a vehicle. The vehicle has a body including a floor, a pillar connected to the floor and a roof supported by the pillar. A seat belt is anchored to the vehicle body and a loop member, such as a D-ring, is mounted on the vehicle pillar adjacent the roof of the vehicle and receives the seat belt in slidable engagement therewith.

In one particular aspect of the invention, the energy absorbing device includes a cylindrical spool defining a longitudinal axis and having first and second ends positioned along said axis. The spool is rotatably mounted to the pillar to allow the spool to rotate about the axis. The energy absorbing device also includes an elongate wire member fixed at one end to the spool, wound about the spool and fixed at another end to the loop member. Tear resistant media at least partially encases the spool and the wire such that when a predetermined load is applied to the seat belt, the wire member cuts through the tear resistant media and unwinds from the spool.

An advantage of the invention is that peak loads are reduced using a simple, low cost energy absorbing device.

Another advantage of the present invention is that the energy absorbing device is positioned near the roof member of the vehicle to reduce peak chest and head loads on the restrained occupant.

Still another advantage of the present invention is that forward movement of the occupant is limited.

Yet another advantage of the present invention is that both acceleration and peak loads are reduced.

Other objects, features and advantages of the present invention will be readily appreciated by those skilled in the automotive occupant restraint arts.

BRIEF DESCRIPTION OF THE DRAWINGS

The invention will now be described, by way of example, with reference to the accompanying drawings, in which.

2

Figures 2A, 2B:
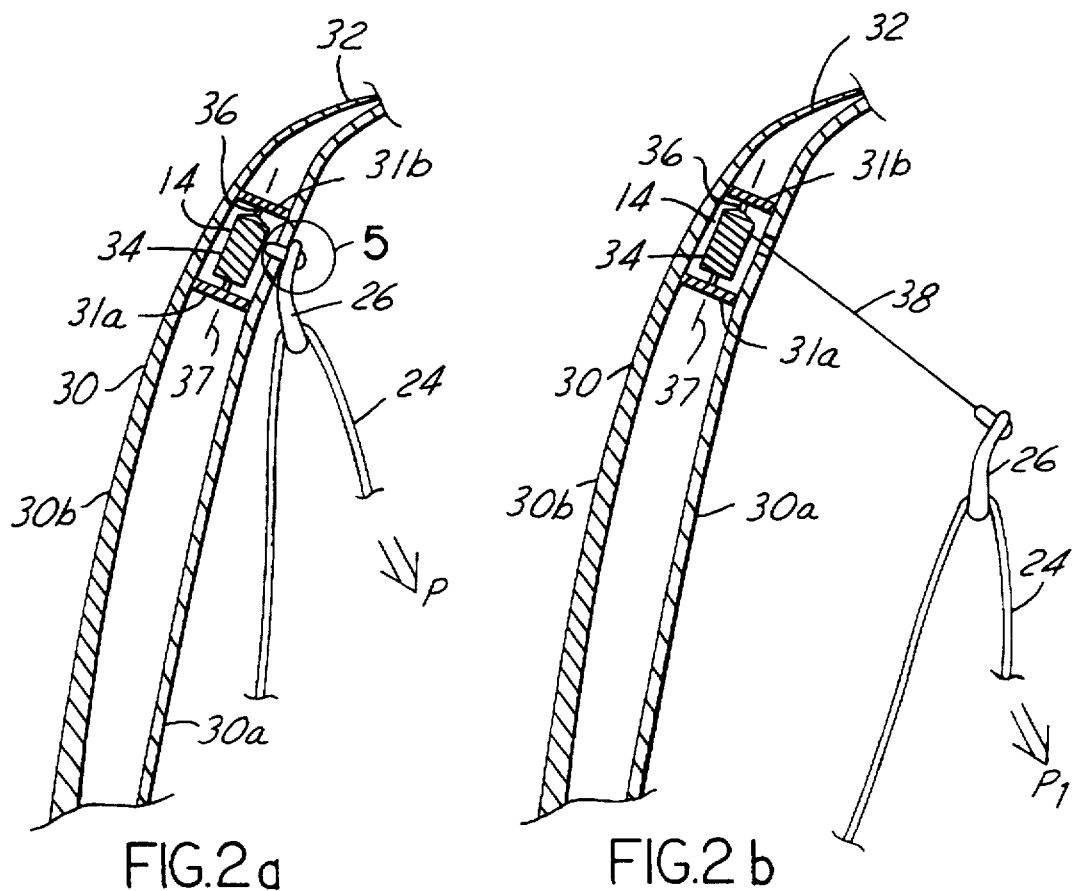
Figure 4A:
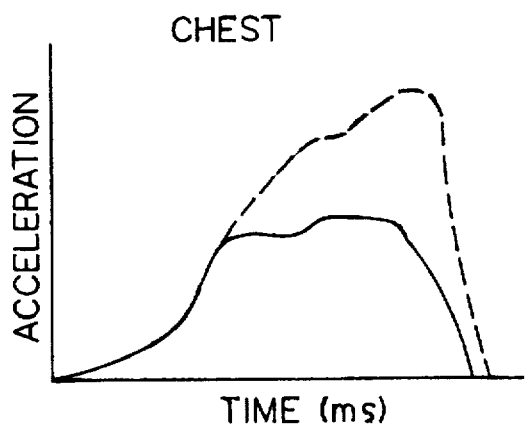
Figure 4B:
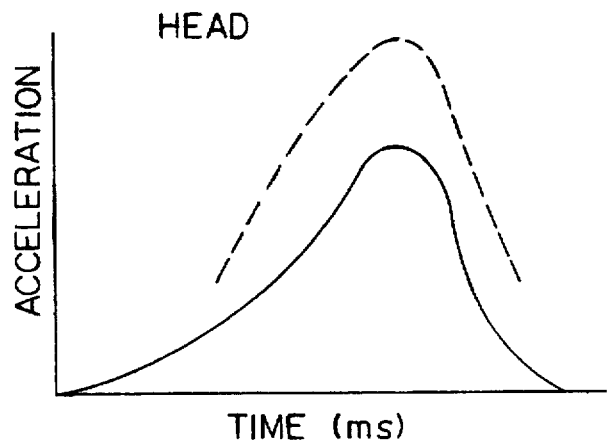
Figure 4C:
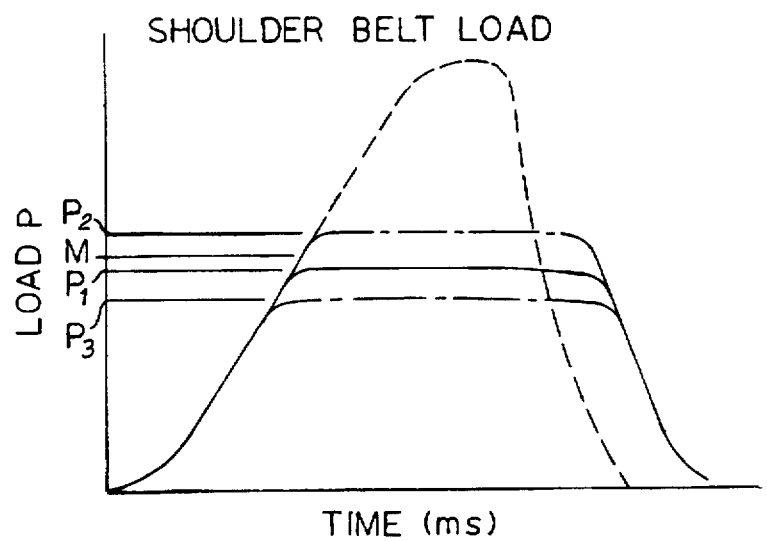

FIGS. 2a and 2b are section views taken through the vehicle pillar;

FIG. 3 is a diagrammatic plan view of an energy absorbing device of the occupant restraint system according to present invention;

FIGS. 4a–4c are graphs representing reduction in acceleration and peak loads; and, FIGS. 5a–5d are diagrammatic cross sectional views of alternative embodiments of a portion of the present invention.

DETAILED DESCRIPTION OF THE PREFERRED EMBODIMENT

Figure 1:
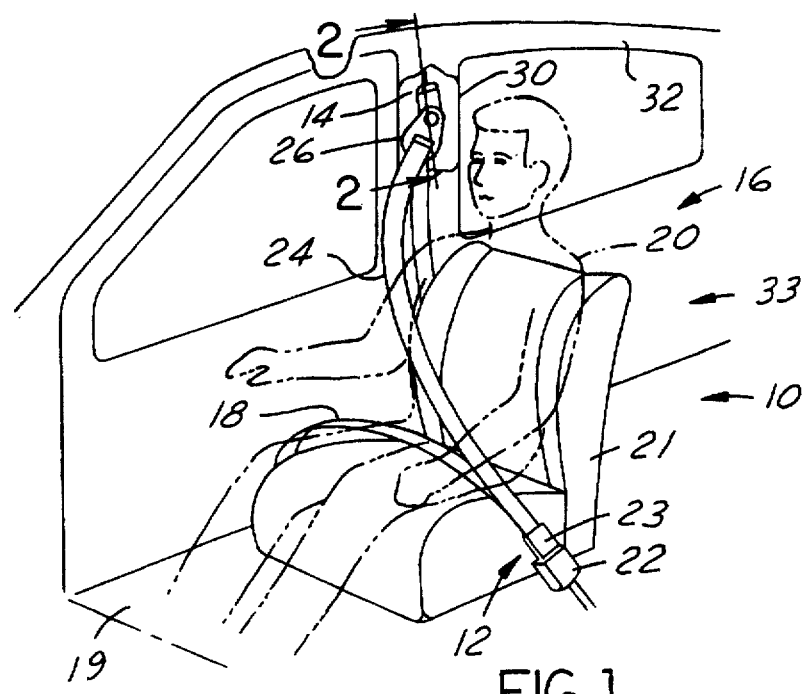
FIG. 1 is a diagrammatic perspective view showing an occupant restraint system in a vehicle according to the present invention.

An occupant restraint system 10 is shown in FIG. 1 to include a seat belt system 12 and an energy absorbing device 14. Belt system 12 is typically referred to as a 3-point continuous loop belt system mounted to vehicle 16. Lap portion 18 of the belt is attached at one end to an anchor (not shown) at floor 19 of vehicle 16. The belt then passes across the lap of an occupant 20 sitting in seat 21 to buckle 22, which is fixedly secured to the floor 19. Buckle 22 includes tongue 23 for releasably securing the belt to buckle 22. The belt continues to chest portion 24 so as to cross the chest and shoulder of occupant 20. Loop member 26, typically referred to as a D-ring, receives the seat belt in slidable engagement therewith. The seat belt then terminates in a retractor (not shown) to permit protraction and retraction of the belt for engaging the occupant 20 in close fitting relationship. According to the present invention, D-ring 26 is secured to energy absorbing device 14, which, in turn, is attached to pillar 30 as will be further described, such as a B-pillar, adjacent roof 32. As is well known to those skilled in the art, floor 19, pillar 30 and roof 32 define a portion of an occupant compartment 33 of vehicle 16.

Turning now to FIGS. 2a, 2b and 3, according to the present invention, energy absorbing device 14 includes cylindrical spool 34, hating shaft 36 extending along longitudinal axis 37. Pillar 30 has interior wall 30a and exterior wall 30b with cross members 31a and 31b fitted therebetween. Each cross member 31a and 31b has a journal (not shown) to receive both ends of shaft 36, respectively so that spool 34 may rotate about axis 37 when spool 34 is attached to the cross members. As best shown in FIG. 3, a wire member 38, which is made of a high strength material such as music wire or steel cable, is fixed at one end by fastener 39 to spool 34, coiled or wound thereabout, and fixed at another end to D-ring 26. Spool 34 is then covered with tear resistant media 42, which at least partially encases both spool 34 and wire member 38.

According to the present invention, when vehicle 16 rapidly decelerates, the occupant's forward movement relative to occupant compartment 33 is restrained by seat belt system 12, which results in a load P (FIG. 2a) on the seat belt. As load P reaches a predetermined level $P_1$ (FIG. 2b), energy absorbing device 14 is activated, thereby limiting the peak load as will be more fully described with reference to FIGS. 4a–4c. Energy absorbing device 14 is activated by wire member 38 cutting through tear resistant media 42 and unwinding from spool 34 so as to absorb some of the energy caused by the rapid deceleration of the vehicle, thereby reducing the peak load. In addition, the length of wire member 38 is sized according to the amount of forward travel available relative to the occupant compartment 33.

In a preferred embodiment, spool 34 is formed with helical groove 44 extending from one end thereof to the other end. Wire member 38 is thus contained within helical groove 44. In addition, the pitch p (FIG. 3) of helical groove 44 is sufficiently large so that as spool 34 rotates, there remains a sufficient amount of uncut material from tear resistant media 42 in juxtaposition with the uncoiled portion of wire member 38 through which wire member 38 can cut. Thus, it is desirable to provide spool member 34 with helical groove 44 having a pitch p of at least twice the thickness of wire member 38.

To further enhance the energy absorbing characteristics of energy absorbing device 14, tear resistant media 42 may be formed of a fiber filled composite shell. Fibers 5 may be either a glass fiber or a carbon fiber. In any event, although fibers 45 may be aligned in a direction substantially parallel to the direction of longitudinal axis 37 of spool 34, it is preferable to use randomly oriented discontinuous fibers 45 in the composite shell, as shown in FIG. 3. As used herein, "discontinuous" means that the length of the individual fibers is substantially less than the length of the composite shell when measured along longitudinal axis 37.

Referring now to FIGS. 4a–4c, occupant restraint system 10, having energy absorbing device 14 of the present invention, reduces the peak acceleration and load, as shown by the solid lines, when compared to an occupant restraint system having no energy absorbing device, as shown by the dashed lines. In particular, FIG. 4a shows a reduction in chest acceleration and FIG. 4b shows a reduction in head acceleration. FIG. 4c shows a reduction of load P on shoulder belt portion 24 from a peak load, shown by the dashed line. When load P on shoulder belt portion 24 reaches a predetermined level $P_1$, wire member 38 cuts through tear resistant media 42 and unwinds from spool 34. The energy absorbed as wire member 38 cuts through tear resistant media 42 effectively truncates the peak load and maintains a substantially constant load $P_1$ until occupant motion is complete. As shown by the dot-dash lines of FIG. 4c, in particular at $P_2$ and $P_3$, the amount of reduction of the peak load may be varied (relative to $P_1$) depending upon a number of factors including the composition of the tear resistant media 42, the length and orientation of fibers 45 embedded in tear resistant media 42, whether glass fibers or carbon fibers are used, the thickness of wire member 38, and other variables as would be readily apparent to those skilled in the art in view of the present invention.

In a preferred embodiment, as shown in FIGS. 5a–5d, D-ring 26 is removably secured to pillar 30 by way of mounting assembly 46, as well as being secured to energy absorbing device 14. This series arrangement provides both a breakaway feature through mounting assembly 46, thereby reducing any potential for undesirable rattling, and a load maintaining feature through energy absorbing device 14. Those skilled in the art will recognize in view of this disclosure that it is desirable to cause mounting assembly 46 to break free from pillar 30 at about the same load $P_1$ as is necessary to activate energy absorbing device 14. In any event, mounting assembly 46 should break free from pillar 30 at a load less than a maximum load M as shown in FIG. 4c. Of course, maximum load M may vary depending upon the load ($P_2$ or $P_3$) at which energy absorbing device 14 is activated. It should be noted that FIGS. 5a–5d each represent enlarged alternative embodiments of mounting assembly 46 encircled by line 5 of FIG. 2a.

Figure 5A:
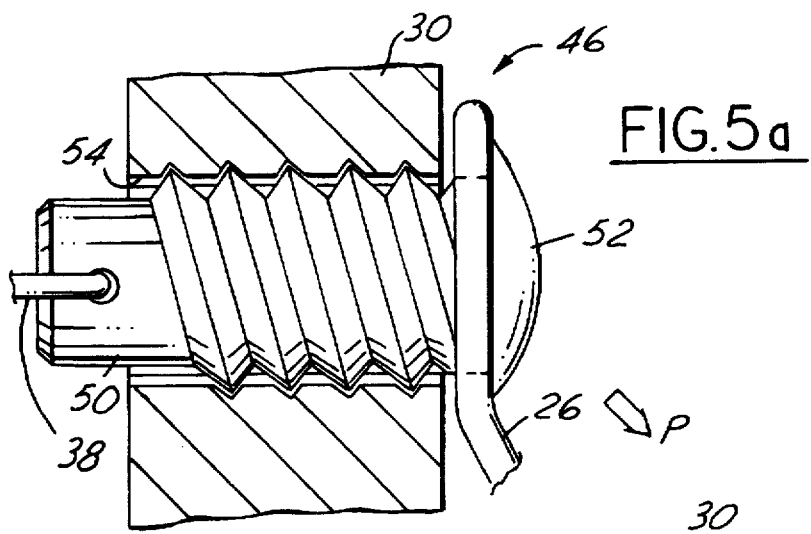

In FIG. 5a, mounting assembly 46 is defined by fastener 50, having head 52, threaded into oversized threaded hole 54 in pillar 30 to removably secure D-ring 26 thereto. When the load P on the seat belt is substantially $P_1$, which is below the maximum load M, the threads of fastener 50 deform thereby allowing fastener 50 and D-ring 26 to disengage from pillar 30 causing wire member 38, which is attached to fastener 50, to cut through tear resistant media 42 and unwind from spool 34.

Figure 5B:
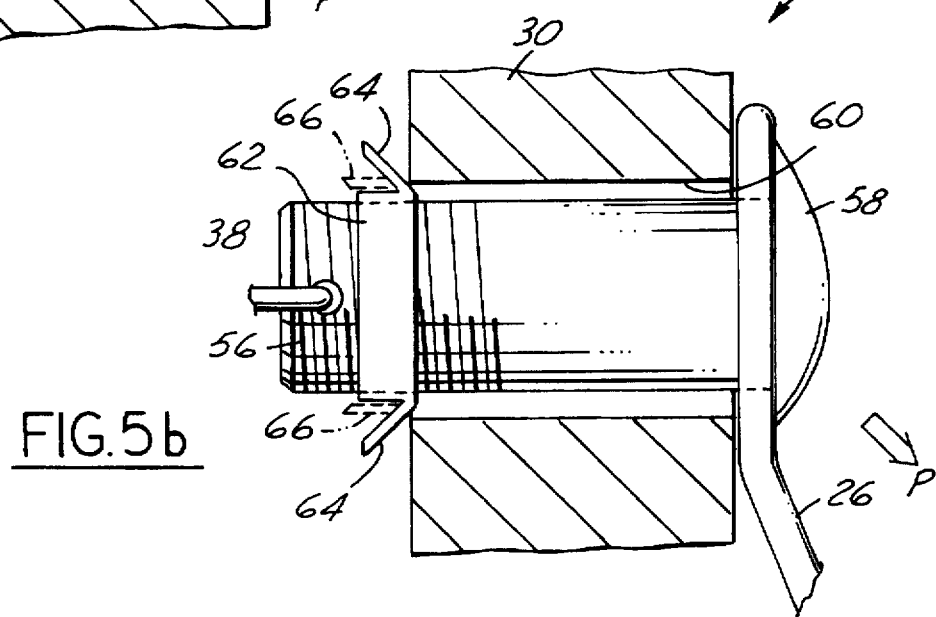

In an alternative embodiment, as shown in FIG. 5b, mounting assembly 46 is defined by fastener 56, having head 58, passing through bore 60 of pillar 30 and engaging winged nut 62 to removably secure D-ring 26 to pillar 30. Wins 64 of nut 62 prevent removal of fastener 56 from pillar 30 until the load P on the seat belt is substantially $P_1$, which is below the maximum load M. Once this load is applied, wings 64 bend, shown in phantom at 66, so as to allow fastener 56 to pass through bore 60 and disengage from pillar 30 causing wire member 38, which is attached to fastener 56, to cut through tear resistant media 42 and unwind from spool 34.

In a third embodiment, as shown in FIG. 5c, mounting assembly 46 is defined by fastener 70, having head 72, passing through bore 74. Shear pin 76 is pressed into fastener 70 to secure D-ring 26 to pillar 30. When the load P on the seat belt is substantially $P_1$, which is below the maximum load M, pin 76 shears generally at location 78. This allows fastener 70 to disengage from pillar 30 causing wire member 38, which is attached to fastener 70, to cut through tear resistant media 42 and unwind from spool 34.

Figure 5D:
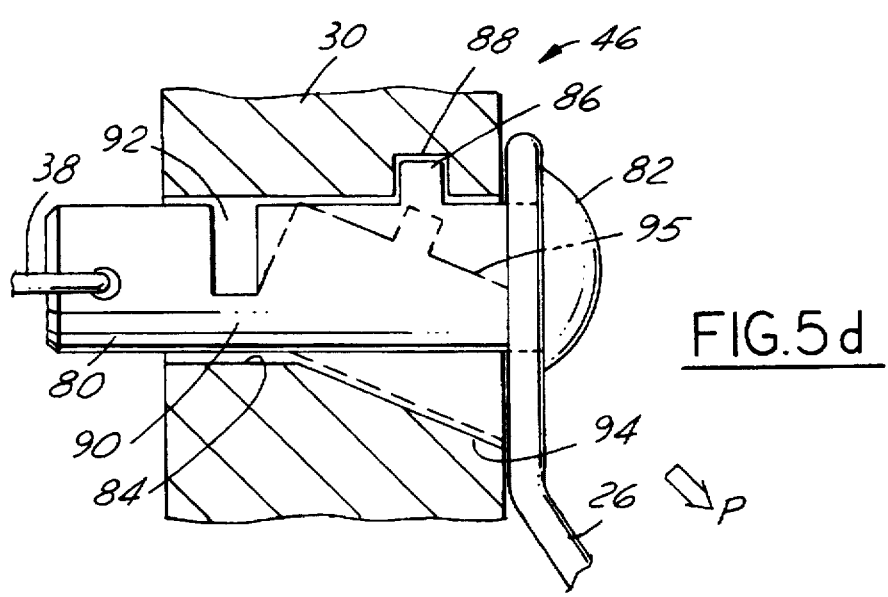

In a fourth embodiment, as shown in FIG. 5d, mounting assembly 46 is defined by fastener 80, having head 82, passing through bore 84. To secure fastener 80 to pillar 30, locking tab 86 is provided on fastener 80 to engage recess 88 in bore 84 of pillar 30. Fastener 80 has an area of reduced cross-section generally shown at location 90. This area of reduced cross-section may be achieved by forming channel 92 in fastener 80. In addition, bore 84 has relief 94 formed therein to allow fastener 80 to bend, as shown in phantom at 95. Thus, when the load on the seat belt is substantially $P_1$, which is below the maximum load M, fastener 80 bends about area 90 of reduced cross-section such that locking tab 86 disengages from recess 88 thereby allowing fastener 80 to disengage from pillar 30 causing wire member 38, which is attached to fastener 80, to cut through tear resistant media 42 and unwind from spool 34.

While the best mode for carrying out the invention is described in detail, those having ordinary skill in the art in which this invention relates will recognize various alternative designs and embodiments, including those mentioned above, in practicing the invention that has been defined by the following claims.

We claim:

1. An energy absorbing device for an occupant restraint system in a vehicle, the vehicle having a body comprising a floor, a pillar connected to the floor and a roof supported by the pillar, the restraint system having a seat belt anchored to the vehicle body and a loop member mounted adjacent the roof of the vehicle and receiving the seat belt in slidable engagement therewith, said energy absorbing device comprising:

a cylindrical spool defining a longitudinal axis and having first and second ends positioned along said axis for rotatably mounting said spool to the pillar;

an elongate wire member having first and second ends, said first end of said wire member being fixed to said spool and said second end of said wire member being connectable to the loop member, said wire member being wound about said spool; and, tear resistant media at least partially encasing said spool and said wire member such that when a predetermined load is applied to said second end of said wire member, said wire member cuts through said tear resistant media and unwinds from said spool.

2. A device according to claim 1 wherein said tear resistant media comprises a fiber filled composite shell being substantially coaxial with said spool.

3. A device according to claim 2 wherein said fiber is one of a glass fiber and a carbon fiber.

4. A device according to claim 2 wherein fibers in said fiber filled composite shell are randomly oriented discontinuous fibers.

5. A device according to claim 1 wherein said cylindrical spool is formed with a helical groove extending along said longitudinal axis from said first end to said second end of said spool, said groove receiving said wire member.

6. A device according to claim 5 wherein the pitch of said helical groove as measured along said longitudinal axis is at least twice the thickness of said wire member.

7. A device according to claim 1 wherein said elongate wire member comprises one of music wire and steel cable.

8. An occupant restraint system for a vehicle, the vehicle having a body comprising a floor, a pillar connected to the floor and a roof supported by the pillar, the restraint system comprising:

a seat belt anchorable to the vehicle body;

a D-ring mountable adjacent the roof of the vehicle and receiving said seat belt in slidable engagement therewith; and, an energy absorbing device attached to said seat belt, said device comprising:

a cylindrical spool defining a longitudinal axis and having first and second ends positioned along said axis for rotatably mounting said spool to the pillar;

an elongate wire member having first and second ends, said first end of said wire member being fixed to said spool and said second end of said wire member being fixed to said D-ring, said wire member being wound about said spool; and, tear resistant media at least partially encasing said spool and said wire member such that when a predetermined load is applied to said seat belt, said wire member cuts through said tear resistant media and unwinds from said spool.

9. A restraint system according to claim 8 wherein said tear resistant media comprises a fiber filled composite shell being substantially coaxial with said spool.

10. A restraint system according to claim 9 wherein said fiber is one of a glass fiber and a carbon fiber.

11. A restraint system according to claim 9 wherein fibers in said fiber filled composite shell are randomly oriented discontinuous fibers.

12. A restraint system according to claim 8 wherein said cylindrical spool is formed with a helical groove extending along said longitudinal axis from said first end to said second end of said spool, said groove receiving said wire member.

13. A restraint system according to claim 12 wherein the pitch of said helical groove as measured along said longitudinal axis is at least twice the thickness of said wire member.

14. A restraint system according to claim 8 wherein said elongate wire member comprises one of music wire and steel cable.

15. A restraint system according to claim 9 wherein a mounting assembly is attached to said wire member at said second end thereof, said mounting assembly for mounting said D-ring to the pillar such that when said predetermined load is applied to said seat belt, said mounting assembly disengages from the pillar thereby activating said energy absorbing device.

16. An occupant restraint system comprising:

a vehicle body having a floor, a pillar connected to the floor, and a roof supported by the pillar;

a seat belt anchored to said vehicle body;

a D-ring mounted to said pillar adjacent said roof and receiving said seat belt in slidable engagement therewith; and, an energy absorbing device attached to said seat belt, said device comprising:

a cylindrical spool defining a longitudinal axis and having first and second ends positioned along said axis for rotatably mounting said spool to said pillar, said spool being formed with a helical groove extending along said longitudinal axis from said first end to said second end of said spool;

an elongate wire member having first and second ends, said first end of said wire member being fixed to said spool and said second end of said wire member being fixed to said D-ring, with said wire member being wound about said spool in said helical groove;

a fiber filled composite shell being substantially coaxial with said spool and at least partially encasing said spool and said wire member; and, said D-ring including a mounting assembly attached to said wire member at said second end thereof, said mounting assembly mounting said D-ring to said pillar such that when a predetermined load is applied to said seat belt, said mounting assembly disengages from said pillar thereby activating said energy absorbing device.

17. A restraint system according to claim 16 wherein said fiber is one of a glass fiber and a carbon fiber.

18. A restraint system according to claim 16 wherein fibers in said fiber filled composite shell are randomly oriented discontinuous fibers.

19. A restraint system according to claim 16 wherein the pitch of said helical groove as measured along said longitudinal axis being at least twice the thickness of said wire member.

* * * * *